US009460560B2

(12) United States Patent
Rodriguez

(10) Patent No.: US 9,460,560 B2
(45) Date of Patent: Oct. 4, 2016

(54) NARROWCASTING FROM PUBLIC DISPLAYS, AND RELATED METHODS

(75) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 41 days.

(21) Appl. No.: 13/193,157

(22) Filed: Jul. 28, 2011

(65) Prior Publication Data
US 2011/0280437 A1    Nov. 17, 2011

Related U.S. Application Data

(62) Division of application No. 12/716,908, filed on Mar. 3, 2010, now Pat. No. 8,412,577.

(60) Provisional application No. 61/157,153, filed on Mar. 3, 2009.

(51) Int. Cl.
*G06Q 30/00*  (2012.01)
*G06T 19/00*  (2011.01)
(Continued)

(52) U.S. Cl.
CPC .......... *G06T 19/006* (2013.01); *G06F 3/011* (2013.01); *G06F 3/0425* (2013.01); *G06Q 30/0269* (2013.01); *G06T 1/0021* (2013.01);
(Continued)

(58) Field of Classification Search
USPC .............. 705/14.49, 14.64, 14.67, 14.58, 50; 713/176; 358/3.28; 382/100, 106; 251/463; 300/478
See application file for complete search history.

(56) References Cited

U.S. PATENT DOCUMENTS 5,862,260 A * 1/1999 Rhoads ............. G06F 17/30876
382/232
6,154,571 A   11/2000 Cox et al.
(Continued)

FOREIGN PATENT DOCUMENTS

EP        0 962 886        12/1999
EP        0 962 886 A2 *   12/1999 ............... G06T 1/00
(Continued)

OTHER PUBLICATIONS

International Search Report and the Written Opinion of the International Searching Authority, in PCT/US10/26096 (corresponding to WO2010/102040), mailed May 7, 2010.
(Continued)

*Primary Examiner* — Luis A Brown
(74) *Attorney, Agent, or Firm* — Digimarc Corporation

(57) ABSTRACT

A user with a cell phone interacts, in a personalized session, with an electronic sign system. In some embodiments, the user's location relative to the sign is discerned from camera imagery—either imagery captured by the cell phone (i.e., of the sign), or captured by the sign system (i.e., of the user). Demographic information about the user can be estimated from imagery captured acquired by the sign system, or can be accessed from stored profile data associated with the user. The sign system can transmit payoffs (e.g., digital coupons or other response data) to viewers—customized per user demographics. In some arrangements, the payoff data is represented by digital watermark data encoded in the signage content. The encoding can take into account the user's location relative to the sign—allowing geometrical targeting of different payoffs to differently-located viewers. Other embodiments allow a user to engage an electronic sign system for interactive game play, using the cell phone as a controller.

13 Claims, 6 Drawing Sheets

(51) Int. Cl.

| | |
|---|---|
| *G06F 3/01* | (2006.01) |
| *G06F 3/042* | (2006.01) |
| *G06Q 30/02* | (2012.01) |
| *G06T 1/00* | (2006.01) |
| *G06T 3/00* | (2006.01) |
| *H04N 21/414* | (2011.01) |
| *H04N 21/8358* | (2011.01) |

(52) U.S. Cl.
CPC ........... *G06T1/0064* (2013.01); *G06T 3/0006* (2013.01); *H04N 21/41415* (2013.01); *H04N 21/8358* (2013.01); *G06T 2201/0051* (2013.01)

(56) References Cited

U.S. PATENT DOCUMENTS

| | | | | |
|---|---|---|---|---|
| 6,216,228 B1* | 4/2001 | Chapman | ............ | G06T 1/0021 348/E7.061 |
| 6,298,176 B2* | 10/2001 | Longacre, Jr. | ................ | 382/312 |
| 6,349,410 B1* | 2/2002 | Lortz | ....................... | H04N 5/76 375/E7.021 |
| 6,385,329 B1* | 5/2002 | Sharma | ................ | G06T 1/0064 348/E7.061 |
| 6,484,148 B1 | 11/2002 | Boyd | | |
| 6,571,279 B1* | 5/2003 | Herz et al. | ................... | 709/217 |
| 6,590,996 B1* | 7/2003 | Reed | .................... | G06T 1/0021 235/468 |
| 6,763,122 B1* | 7/2004 | Rodriguez | ............ | G06T 1/0028 358/3.28 |
| 6,947,571 B1* | 9/2005 | Rhoads | ................... | G06Q 30/02 382/100 |
| 7,050,603 B2 | 5/2006 | Rhoads et al. | | |
| 7,123,740 B2* | 10/2006 | McKinley | ............ | G06F 21/125 368/10 |
| 7,188,186 B1* | 3/2007 | Meyer | ................ | H04N 1/32144 709/231 |
| 7,212,663 B2* | 5/2007 | Tomasi | ................. | G01B 11/25 386/106 |
| 7,254,249 B2* | 8/2007 | Rhoads et al. | ................ | 382/100 |
| 7,921,036 B1 | 4/2011 | Sharma et al. | | |
| 7,925,549 B2* | 4/2011 | Looney et al. | ................ | 705/27.1 |
| 2002/0066111 A1* | 5/2002 | Rodriguez | ............ | G06T 1/0085 725/135 |
| 2002/0067844 A1* | 6/2002 | Reed | ................. | G06F 17/30876 382/100 |
| 2002/0090114 A1* | 7/2002 | Rhoads | ............. | G06F 17/30876 382/100 |
| 2002/0188841 A1* | 12/2002 | Jones | ................ | G06F 17/30876 713/153 |
| 2003/0012548 A1* | 1/2003 | Levy | .................... | G06F 21/125 386/251 |
| 2003/0126013 A1* | 7/2003 | Shand | ........................... | 705/14 |
| 2004/0008866 A1* | 1/2004 | Rhoads | ............. | G06F 17/30241 382/100 |
| 2004/0158724 A1* | 8/2004 | Carr | ...................... | B42D 25/00 713/186 |
| 2005/0114231 A1 | 5/2005 | Kinjo | | |
| 2005/0169499 A1* | 8/2005 | Rodriguez | .............. | G01S 19/14 382/100 |
| 2006/0125968 A1 | 6/2006 | Yokozawa et al. | | |
| 2006/0133645 A1 | 6/2006 | Rhoads | | |
| 2006/0284839 A1 | 12/2006 | Breed | | |
| 2006/0285532 A1* | 12/2006 | Radziewicz et al. | ......... | 370/352 |
| 2007/0067493 A1 | 3/2007 | Issa | | |
| 2007/0116325 A1 | 5/2007 | Rhoads et al. | | |
| 2007/0214406 A1* | 9/2007 | Rhoads | .............. | G06K 9/00577 715/205 |
| 2007/0242853 A1* | 10/2007 | Rodriguez | .............. | G01S 19/14 382/100 |
| 2007/0274561 A1* | 11/2007 | Rhoads | ................... | G06F 3/017 382/100 |
| 2008/0025561 A1* | 1/2008 | Rhoads | .................. | G01C 11/00 382/100 |
| 2008/0052783 A1* | 2/2008 | Levy | ................. | G06F 17/30067 726/26 |
| 2008/0080737 A1* | 4/2008 | Rhoads | .................. | G01C 11/00 382/100 |
| 2008/0089550 A1 | 4/2008 | Brundage et al. | | |
| 2008/0133555 A1* | 6/2008 | Rhoads | ............... | G06F 17/3002 |
| 2009/0025024 A1 | 1/2009 | Beser et al. | | |
| 2009/0088243 A1* | 4/2009 | Gagner | .................... | G07F 17/32 463/25 |
| 2009/0141939 A1 | 6/2009 | Chambers et al. | | |
| 2010/0013951 A1* | 1/2010 | Rodriguez | ............ | G06T 1/0064 348/222.1 |
| 2010/0069158 A1* | 3/2010 | Kim | ................................ | 463/42 |
| 2010/0076834 A1 | 3/2010 | Sugaya et al. | | |
| 2010/0119208 A1* | 5/2010 | Davis | ..................... | H04N 5/765 386/291 |
| 2010/0150434 A1* | 6/2010 | Reed | ..................... | G06T 1/0028 382/162 |
| 2010/0174421 A1* | 7/2010 | Tsai et al. | ...................... | 700/302 |
| 2010/0257252 A1* | 10/2010 | Dougherty | ......... | G06K 9/00979 709/217 |
| 2012/0184352 A1* | 7/2012 | Detlefsen | ............ | G07F 17/3225 463/25 |

FOREIGN PATENT DOCUMENTS

| | | | | |
|---|---|---|---|---|
| SG | WO 00/36605 | * | 6/2000 | ............ G11B 23/28 |
| WO | WO00/36605 | | 6/2000 | |
| WO | WO2006/080228 | | 8/2006 | |
| WO | WO2010/102040 | | 9/2010 | |

OTHER PUBLICATIONS

International Preliminary Report on Patentability in PCT/US10/26096 (corresponding to WO2010/102040), Sep. 15, 2011.

Excerpts from prosecution of corresponding Japanese application 2011-553088 (based on PCT publication WO2010102040), including claims presented for examination, JPO action dated Feb. 4, 2014, claims filed in response, JPO action dated Dec. 16, 2014, claims filed in response, and granted patent cover sheet.

* cited by examiner

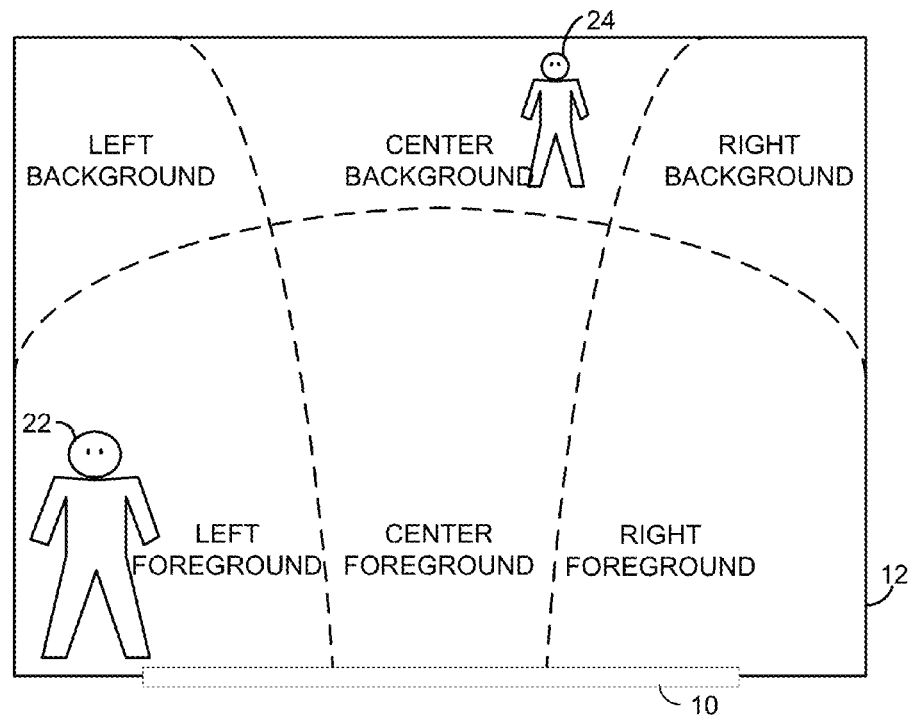
FIG. 2
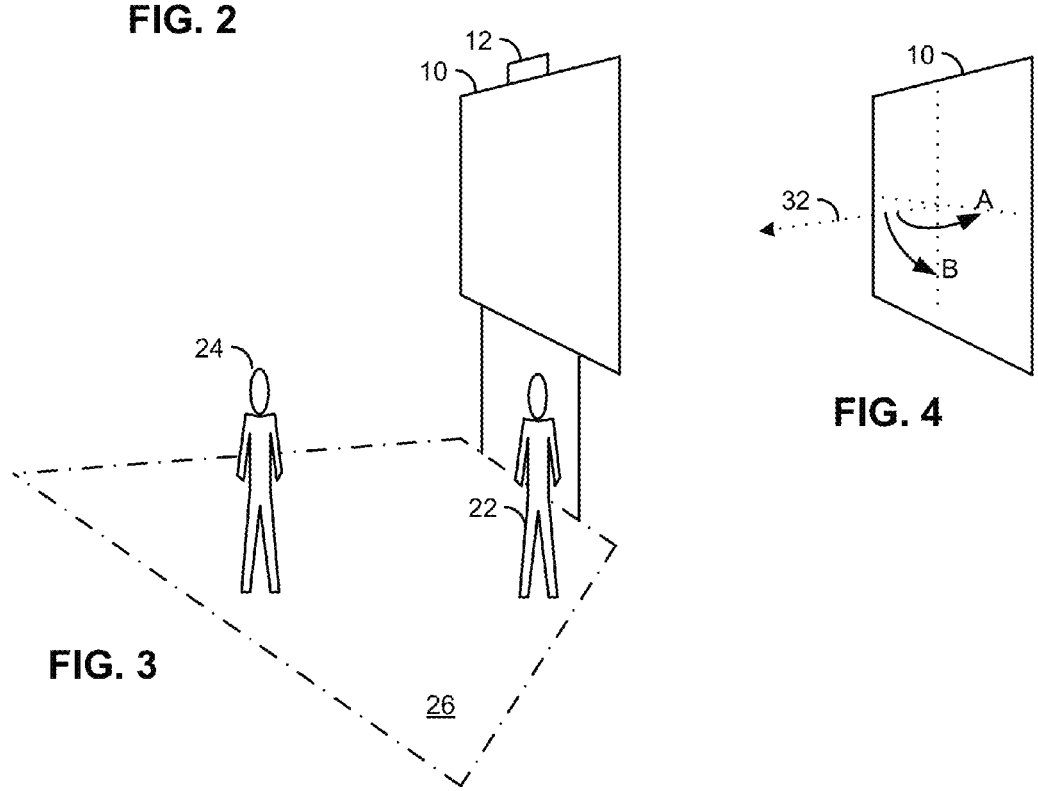
FIG. 3
FIG. 4

| 8 BITS PROTOCOL ID | 4 BITS DEMOGRAPHIC ID | 32 BITS IMMEDIATE RESPONSE DATA | 20 BITS REMOTE DATABASE INDEX |

NARROWCASTING FROM PUBLIC DISPLAYS, AND RELATED METHODS

RELATED APPLICATION DATA

This application is a division of application Ser. No. 12/716,908, filed Mar. 3, 2010, which claims priority to provisional application 61/157,153, filed Mar. 3, 2009. The disclosures of these applications are incorporated-by-reference herein.

TECHNICAL FIELD

The present technology relates to electronic displays, and more particularly relates to arrangements employing portable devices (e.g., cell phones) to interact with such displays.

BACKGROUND AND INTRODUCTION

The present technology relates to that detailed in the assignee's copending application Ser. Nos. 12/271,772, filed Nov. 14, 2008 (published as US20100119208); Ser. No. 12/484,115, filed Jun. 12, 2009 (published as US20100048242); Ser. No. 12/490,980, filed Jun. 24, 2009 (published as US20100205628); PCT/US09/54358, filed Aug. 19, 2009 (published as WO2010022185); PCT/US2010/021836, filed Jan. 22, 2010 (published as WO2010093510); and Ser. No. 12/712,176, filed Feb. 24, 2010 (published as US20110098056).

The principles and teachings from the just-noted work are intended to be applied in the context of the presently-detailed arrangements, and vice versa Electronic display screens are becoming prevalent in public places, and are widely used for advertising. Some display systems try to heighten viewer engagement by interactivity of various sorts.

Frederik Pohl's 1952 science fiction novel *The Space Merchants* foreshadowed interactive electronic advertising. A character complains that every time he turned to look out the window of an airplane, "wham: a . . . . Taunton ad for some crummy product opaques the window and one of their nagging, stupid jingles drills into your ear."

Fifty years later, in the movie Minority Report, Tom Cruise tries to unobtrusively walk through a mall, only to be repeatedly identified and hailed by name, by electronic billboards.

Published patent application WO 2007/120686 by Quividi discloses electronic billboards equipped with camera systems that sense viewers and estimate their ages and genders. Ads can be targeted in accordance with the sensed data, and audience measurement information can be compiled.

TruMedia markets related automated audience measurement technology, used in connection with electronic billboards and store displays. A sign can present an ad for perfume if it detects a woman, and an ad for menswear it if detects a man.

Mobile Trak, Inc. offers a SmarTrak module for roadside signage, which monitors stray local oscillator emissions from passing cars, and thereby discerns the radio stations to which they are tuned. Again, this information can be used for demographic profiling and ad targeting.

BluScreen is an auction-based framework for presenting advertising on electronic signage. The system senses Bluetooth transmissions from nearby viewers who allow profile data from their cell phones to be publicly accessed. BluScreen passes this profile data to advertisers, who then bid for the opportunity to present ads to the identified viewers.

The French institute INRIA has developed an opt-in system in which an electronic public display board senses mobile phone numbers of passersby (by Bluetooth), and sends them brief messages or content (e.g., ringtones, videos, discount vouchers). The content can be customized in accordance with user profile information shared from the mobile phones. See, e.g., US patent publication 20090047899.

BlueFire offers several interactive signage technologies, using SMS messaging or Bluetooth. One invites observers to vote in a poll, e.g., who will win this weekend's game? Once the observer is thus-engaged, an advertiser can respond electronically with coupons, content, etc., sent to the observer's cell phone.

A marketing campaign by Ogilvy fosters user engagement with electronic signage through use of rewards. A sign invites viewers to enter a contest by sending an SMS message to a specified address. The system responds with a question, which—if the viewer responds with the correct answer—causes the sign to present a congratulatory fireworks display, and enters the viewer in a drawing for a car.

Certain embodiments of the present technology employ digital watermarking. Digital watermarking (a form of steganography) is the science of encoding physical and electronic objects with plural-bit digital data, in such a manner that the data is essentially hidden from human perception, yet can be recovered by computer analysis. In electronic objects (e.g., digital audio or imagery—including video), the data may be encoded as slight variations in sample values (e.g., luminance, chrominance, audio amplitude). Or, if the object is represented in a so-called orthogonal domain (also termed "non-perceptual," e.g., MPEG, DCT, wavelet, etc.), the data may be encoded as slight variations in quantization or coefficient values. The present assignee's U.S. Pat. Nos. 6,122,403, 6,590,996, 6,912,295 and 7,027,614, and application Ser. No. 12/337,029 (filed Dec. 17, 2008, published as US20100150434) are illustrative of certain watermarking technologies.

Watermarking can be used to imperceptibly tag content with persistent digital identifiers, and finds myriad uses. Some are in the realm of device control—e.g., conveying data signaling how a receiving device should handle the content with which the watermark is conveyed. Others encode data associating content with a store of related data. For example, a photograph published on the web may encode a watermark payload identifying a particular record in an online database. That database record, in turn, may contain a link to the photographer's web site. U.S. Pat. No. 6,947,571 details a number of such "connected-content" applications and techniques.

Digital watermarking systems typically have two primary components: an encoder that embeds the watermark in a host media signal, and a decoder that detects and reads the embedded watermark from the encoded signal. The encoder embeds a watermark by subtly altering the host media signal. The payload of the watermark can be any number of bits; 32 or 128 are popular payload sizes, although greater or lesser values can be used (much greater in the case of video—if plural frames are used). The reading component analyzes a suspect signal to detect whether a watermark is present. (The suspect signal may be image data captured, e.g., by a cell phone camera.) If a watermark signal is detected, the reader typically proceeds to extract the encoded information from the watermark.

One popular form of watermarking redundantly embeds the payload data across host imagery, in tiled fashion. Each tile conveys the entire payload, permitting a reader to extract the payload even if only an excerpt of the encoded image is captured.

In accordance with one aspect of the present technology, different digital watermark messages are "narrowcast" to each of plural different observers of an electronic sign. In one arrangement, the location of each observer relative to the sign is determined. Watermarks are then geometrically designed for the different observers, in accordance with their respective viewpoints. For example, the watermark tiles can be pre-distorted to compensate for distortion introduced by each observer's viewing perspective. The payloads of the various watermarks can be tailored in accordance with sensed demographics about the respective observers (e.g., age, gender, ethnicity). Imagery encoded with such thus-arranged watermark signals is then presented on the sign.

Due to the different geometries of the different watermarks, different observers detect different watermark payloads. Thus, a teen boy in the right-foreground of the sign's viewing area may receive one payload, and an adult man in the left-background of the sign's viewing area may receive a different payload. The former may be an electronic coupon entitling the teen to a dollar off a Vanilla Frappuccino drink at the Starbucks down the mall; the latter may be an electronic coupon for a free New York Times at the same store. As different people enter and leave the viewing area, different watermarks can be respectively added to and removed from the displayed sign content.

The locations of the respective observers can be detected straightforwardly by a camera associated with the electronic sign. In other embodiments, determination of location can proceed by reference to data provided from an observer's cell phone, e.g., the shape of the sign as captured by the cell phone camera, or location data provided by a GPS or other position-determining system associated with the cell phone.

Current watermark detectors excel at recovering watermarks even from severely distorted content. Accordingly, the detector in a viewer's cell phone may detect a watermark not tailored for that viewer's position. The preferred watermark detector outputs one or more parameters characterizing attributes of the detected watermark (e.g., rotation, scale, bit error rate, etc.). The detection software may be arranged to provide different responses, depending on these parameters. For example, if the scale is outside a desired range, and the bit error rate is higher than normal, the cell phone can deduce that the watermark was tailored for a different observer, and can provide a default response rather than the particular response indicated by the watermark's payload. E.g., instead of a coupon for a dollar off a Vanilla Frappuccino drink, the default response may be a coupon for fifty cents off any Starbucks purchase.

In other embodiments, different responses are provided to different viewers without geometrically tailoring different watermarks. Instead, all viewers detect the same watermark data. However, due to different profile data associated with different viewers, the viewer devices respond differently.

For example, software on each user device may send data from the detected watermark payload to a remote server, together with data indicating the age and/or gender of the device owner. The remote server can return different responses, accordingly. To the teen boy, the server may issue a coupon for free popcorn at the nearby movie theater. To the adult man, the server may issue a coupon for half-off a companion's theater admission.

In a related example, different watermarks are successively presented in different frames of a video presentation on the display screen. Each watermark payload includes a few or several bits indicating the audience demographic or context to which it is targeted (e.g., by gender, age, ethnicity, home zip code, education, political or other orientation, social network membership, etc.). User devices examine the different watermark signals, but take action only when a watermark corresponding to demographic data associated with a user of that device is detected (e.g., stored in a local or remote user profile dataset).

In still a further arrangement, different frames of watermark data are tailored for different demographic groups of viewers in accordance with a time-multiplexed standard—synchronized to a reference clock. The first frame in a cycle of, e.g., 30 frames, may be targeted to teen boys. The second may be targeted to teen girls, etc. Each receiving cell phone knows the demographic of the owner and, by consulting the cell phone's time base, can identify the frame of watermark intended for such a person. The cycle may repeat every second, or other interval.

In another arrangement, the multiplexing of different watermarks across the visual screen channel can be accomplished by using different image frequency bands to convey different watermark payloads to different viewers.

Some embodiments of the present technology make no use of digital watermarks. Yet differently-located viewers can nonetheless obtain different responses to electronic signage.

In one such arrangement, the locations of observers are determined, together with their respective demographics, as above. The sign system then determines what responses are appropriate to the differently-located viewers, and stores corresponding data in an online repository (database server). For the teen boy in the right foreground of an electronic sign for the Gap store, the system may store a coupon for a free trial size bottle of cologne. For the middle aged woman in the center background, the stored response may be a five dollar Gap gift certificate.

When an observer's cell phone captures an image of the sign, data related to the captured imagery is transmitted to a computer associated with the sign. Analysis software, e.g., at that computer, determines—from the size of the depicted sign, and the length ratio between two of its sides (or other geometrical analysis), the viewer's position. With this information the computer retrieves corresponding response information stored by the sign, and returns it back to the observer. The teen gets the cologne, the woman gets the gift certificate.

The foregoing and other features and advantages of the present technology will be more readily apparent from the following detailed description, which proceeds with reference to the accompanying drawings.

BRIEF DESCRIPTION OF THE DRAWINGS

FIG. 2 shows a field of view of a camera mounted on top of an electronic sign, including two viewers, and six viewing zones.

FIG. 3 is a perspective view of two viewers in a viewing zone of an electronic sign.

FIG. 4 is a diagram showing that the direction to each viewer can be characterized by a horizontal azimuth angle A and a vertical elevation angle B.

DETAILED DESCRIPTION

Figure 1:
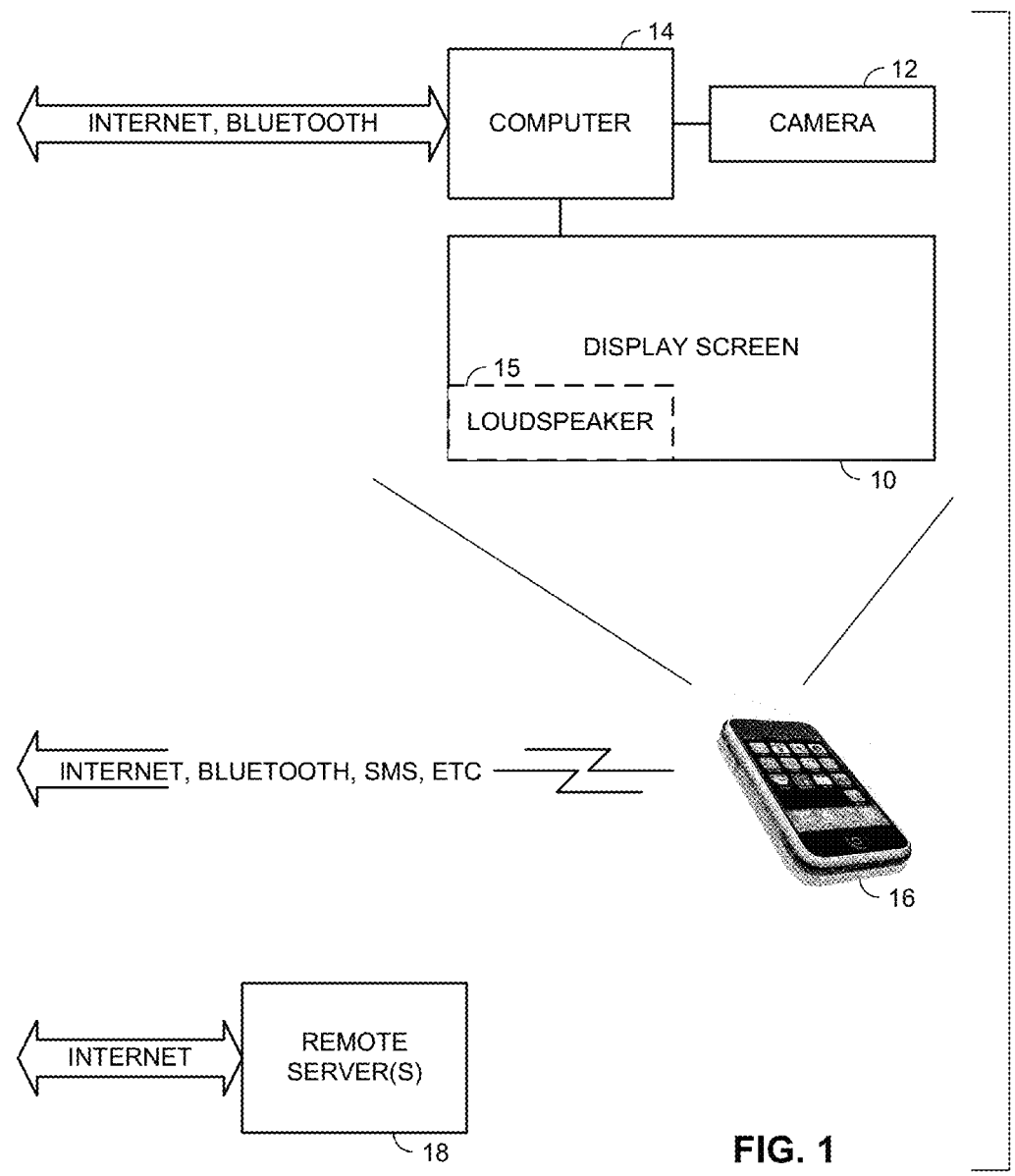
FIG. 1 is a diagram showing some of the apparatus employed in an illustrative embodiment.

FIG. 1 shows some of the apparatus employed in one implementation of the present technology. An electronic display system portion includes a display screen 10, a camera 12, and a computer 14. The display screen may include a loudspeaker 15, or such a speaker may be separately associated with the system. The computer 14 has connectivity to other devices by one or more arrangements such as internet, Bluetooth, etc. The computer 14 controls the information displayed on the display screen. (A single computer may be responsible for control of many screens—such as in an airport.)

The display screen 10 is viewed by an observer carrying an imaging device, such as a cell phone (smart phone) 16. It, too, has connectivity to other devices, such as by internet, Bluetooth, cellular (including SMS), etc.

Also involved in certain embodiments are one or more remote computers 18, with which the just-noted devices can communicate by internet or otherwise.

FIGS. 2 and 3 show two observers 22, 24 viewing the electronic sign 10. In this example a viewing area 26 in front of the sign is arbitrarily divided into six zones: left, center and right (as viewed from the sign)—each with foreground and background positions. Observer 22 is in the left foreground, and observer 24 is in the center background.

Camera 12 captures video of the viewing area 26, e.g., from atop the sign 10. From this captured image data, the computer 14 determines the position of each observer.

The position may be determined in a gross sense, e.g., by classifying each viewer in one of the six viewing zones of FIG. 2. Or more precise location data can be generated, such as by identifying the azimuth (A), elevation (B) and length of a vector 32 from the middle of the screen to the mid-point of the observer's eyes, as shown in FIG. 4. (Distance to the viewer can be estimated by reference to the distance—in pixels—between the users' eye pupils, which is typically 2.8-3.1 inches.)

(The camera system 12 may be modeled, or measured, to understand the mapping between pixel positions within its field of view, and orientations to viewers. Each pixel corresponds to imagery incident on the lens from a unique direction.)

Figure 6:
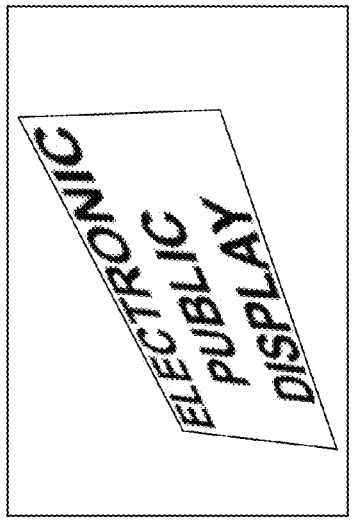
FIGS. 6 and 7 are views of the FIG. 5 sign, as seen by the two observers in FIGS. 2 and 3.
Figure 7:
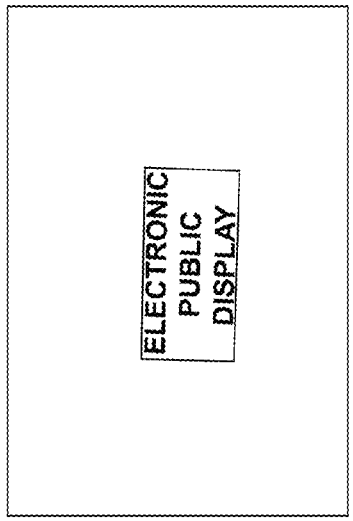
Figure 5:
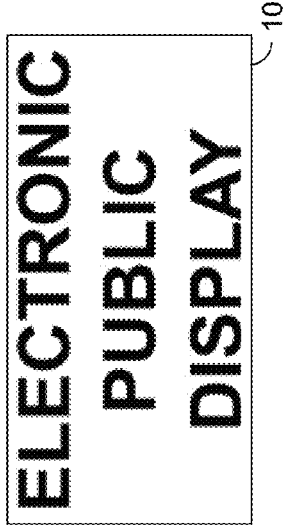
FIG. 5 is a view of an electronic sign with a displayed message.

FIG. 5 shows a display that may be presented on the electronic sign 10. FIGS. 6 and 7 show this same sign from the vantage points of the left foreground observer 22, and the center background observer 24, respectively. The size and shape of the display perceived by the different observers depends on their respective positions. This is made clearer by FIG. 8A.

Figure 8A:
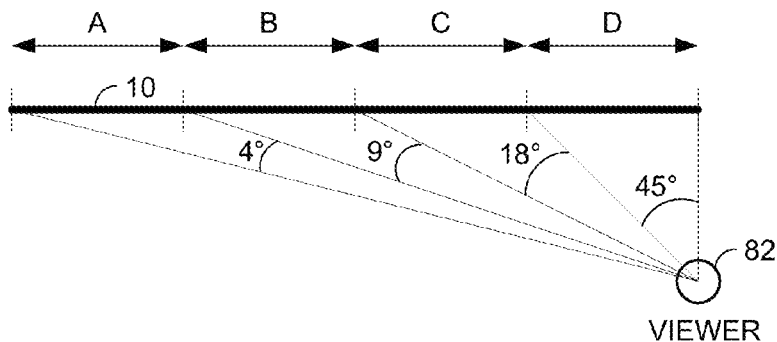
FIG. 8A is a top-down view showing, for four vertical zones A-D of a display screen, how more distant parts of the screen subtend smaller angles for a viewer.

FIG. 8A shows a top-down view of the screen 10, with an observer 82 positioned in front of the screen's edge. If the screen is regarded as having four equal-width vertical quarter-panels A-D, it will be seen that the nearest panel (D) subtends a 45 degree angle as viewed by the observer in this case. The other quarter-panels C, B and A subtend progressively smaller ranges of the observer's field of view. (The entire screen fills about 76 degrees of the observer's field of view, so the 45 degree apparent width of the nearest quarter-panel is larger than that of the other three quarter-panels combined.)

This phenomenon distorts the imagery presented on the screen, as viewed by the observer. The human eye and brain, or course, have no trouble with this distortion; it is taken for granted—ever-present in nearly everything we see.

If a watermark is hidden in the imagery, it will be similarly distorted as viewed by the cell phone 16. In a watermark of the tiled variety, tiles nearest the viewer will appear relatively larger, and tiles further away will appear relatively smaller. Contemporary watermark detectors, such as those disclosed in U.S. Pat. No. 6,590,996, are robust to such distortion. The detector assesses the scale and rotation of each component tile, and then decodes the payload from each. The payloads from all of the decoded tiles are combined to yield output watermark data that is reliable even if data from certain tiles is unreadable.

Figure 8B:
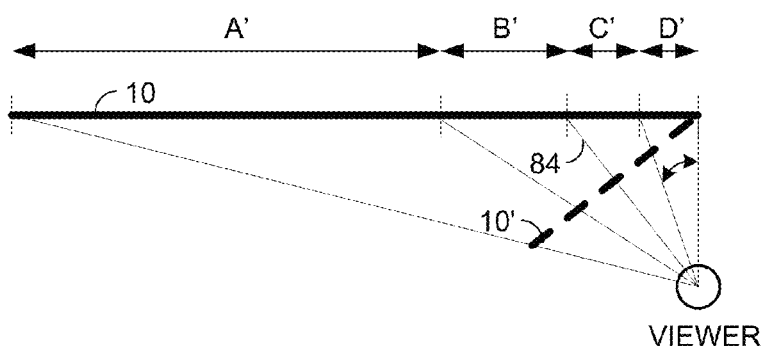
FIG. 8B shows how the phenomenon of FIG. 8A can be redressed, by pre-distorting information presented on the screen.

Notwithstanding this capability, in one implementation of the present technology the watermark pattern hidden in the imagery is pre-distorted in accordance with the location of the observer so as to counteract this perspective distortion. FIG. 8B illustrates one form of such pre-distortion. If the screen 10 is again regarded as having four vertical panels, they are now of different widths. The furthest panel A' is much larger than the others. The pre-distortion is arranged so that each panel subtends the same angular field of view to the observer (in this case about 19 degrees).

To a first approximation, this pre-distortion can be viewed as projecting the watermark from screen 10 onto a virtual screen 10', relative to which the observer is on the center axis 84.

Figure 9:
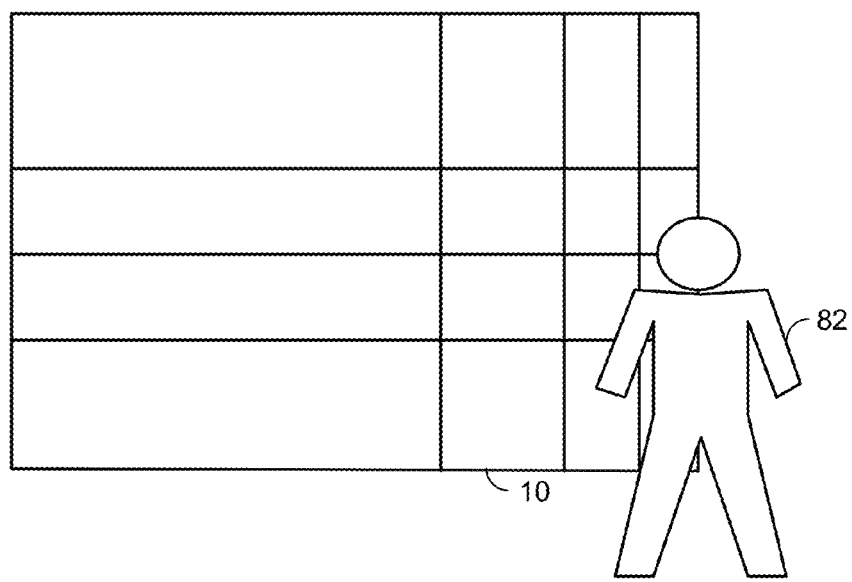
FIG. 9 shows a display pre-distorted in two dimensions, in accordance with position of a viewer.

FIG. 9 shows the result of this watermark pre-distortion, in two dimensions. Each rectangle in FIG. 9 shows the extent of one illustrative watermark tile. Tiles nearest the viewer are relatively smaller; those remote are relative larger.

The tile widths shown in FIG. 9 correspond to widths A'-D' of FIG. 8B. The tile heights also vary in accordance with vertical position of the observer's perspective (here regarded to be along the vertical mid-line of the screen). Tiles near the top and bottom of the screen are thus taller than tiles along the middle.

When the watermark tiles are pre-distorted in the FIG. 9 fashion, the watermark detector finds that each tile has substantially the same apparent scale. No longer does a portion of the screen closer to the observer present larger tiles, etc. It is as if the watermark detector is seeing the screen from a point along the central axis projecting from the screen, from a distance.

Figure 10:
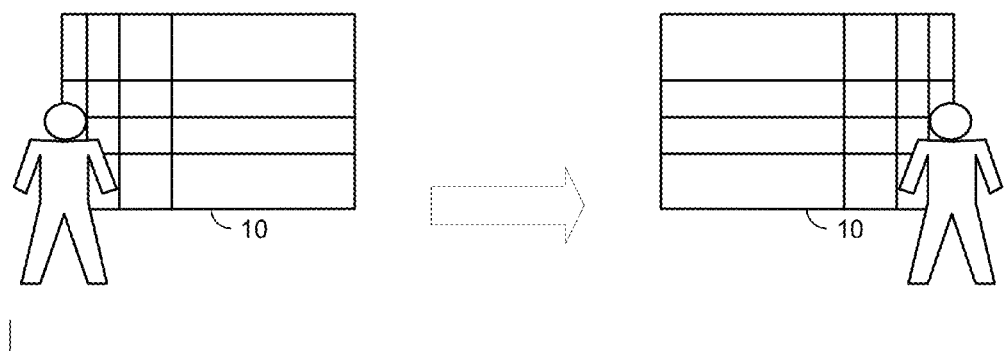
FIG. 10 shows how two watermarks, with different pre-distortion, can be presented on the screen.

As shown in FIG. 10, the computer 14 can vary the distortion of the watermark pattern presented on the display screen, in accordance with changes in the detected position of the observer. So if the observer moves from one side of the screen to another, the pre-distortion of the watermark pattern can follow the observer accordingly.

Note that advertising, or other human-perceptible imagery presented on the screen 10, is not pre-distorted. That is, the human viewer sees the advertising with the familiar location-dependent perspective distortion effects that we see all the time. The watermark detector, however, sees a substantially undistorted, uniform watermark pattern—regardless of observer (cell phone) location.

The same arrangement can be extended to plural different observers. The electronic sign system can present several different watermark patterns on screen 10—each targeting a different observer. The different patterns can be interleaved in time, or presented simultaneously.

Figure 11:
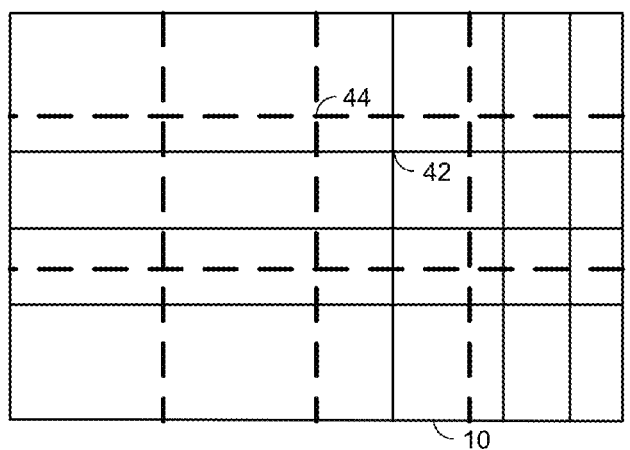
FIG. 11 shows how the pre-distortion of presented watermark information can be varied, as the position of an observer varies.

The use of multiple watermark patterns on the same display screen is conceptually illustrated by patterns 42 and 44 in FIG. 11. The first watermark pattern 42 (depicted in fine solid lines) is an array of pre-distorted tiles identical to that of FIG. 9. The second pattern 44 (depicted in bold dashed lines) is a different array of tiles, configured for a different observer. In particular, this second pattern is evidently targeted for an observer viewing from the center axis of the display, from a distance (because the tiles are all of uniform size). The intended observer of pattern 44 is also evidently further from the screen than the intended observer of pattern 42 (i.e., the smallest tile of watermark pattern 44 is larger than the smallest tile of watermark pattern 42—indicating a more remote viewing perspective is intended).

In the case of time-sequential interleaving of different watermarks, the computer 14 encodes different frames of displayed content with different watermark patterns (each determined in accordance with location of an observer). The applied watermark pattern can be changed on a per-frame basis, or can be held static for several frames before changing. Decoders in observing cell phones may decode all the watermarks, but may be programmed to disregard those that apparently target differently-located observers. This can be discerned by noting variation in the apparent scale of the component watermark tiles across the field of view: if the tiles within a frame are differently-scaled, the pattern has evidently been pre-distorted for a different observer. Only if all of the tiles in a frame have substantially uniform scale does the cell phone detector regard the pattern as targeted for that observer, and take action based thereon.

In the case of simultaneous display of plural watermark patterns, the computer 14 computes the patterns individually (again, each based on targeted observer location), and then combines the patterns for encoding into the displayed content.

In this implementation, decoders in observing cell phones are tuned relatively sharply, so they only respond to watermark tiles that have a certain apparent size. Tiles patterns that are larger or smaller are disregarded—treated like part of the host image content: noise to be ignored.

To illustrate, consider a camera with an image sensor that outputs images of size 1200 by 1600 pixels. The camera's watermark decoder parameters may be tuned so that it responds only to watermark tiles having a nominal size of 200 pixels per side, +/−10 pixels.

Figure 12:
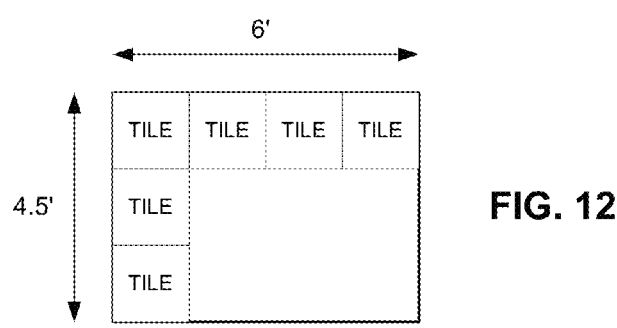
FIG. 12 shows how the size of a watermark tile can be tailored, by a watermark encoder, to target a desired observer.

For sake of simplicity, imagine the electronic display screen has the same aspect ratio as the camera sensor, but is 4.5 feet tall and 6 feet wide. Imagine, further, that the intended viewer is on the sign's center line—far enough away that the sign only fills a fourth of the camera's field of view (i.e., half in height, half in width, or 600×800 camera pixels). In this arrangement, the computer 14 must size the displayed watermark tiles to be 1.5 feet on a side in order to target the intended observer. That is, for the watermark tiles to be imaged by the camera as squares that are 200 pixels on a side, three of them must span the sign vertically, and four across, as shown in FIG. 12. (For clarity of illustration, the uniform tile grid of FIG. 12, and of pattern 44 in FIG. 11, ignores the pre-distortion that may be applied to counteract the apparent distortion caused by the observer's perspective from the sign's center line, i.e., that tiles the left and right edges of the sign are further away and so should be enlarged, etc.)

It will be recognized that the same narrow tuning of the watermark detector can be employed in the time-sequential interleaving of different watermark patterns—to distinguish the intended watermark pattern from patterns targeting other observers.

By the arrangements just-described, displayed watermark patterns take into account the positions of targeted observers. The payloads of these watermarks can also be tailored to the targeted observers.

In one particular arrangement the payloads are tailored demographically. The demographics may be determined from imagery captured by the camera 12 (e.g., age, ethnicity, gender). Alternatively, or in addition, demographic data may be provided otherwise, such as by the individual. For example, data stored in the individual's cell phone, or in the individual's FaceBook profile, may be available, and may reveal information including home zip code and area code, income level, employment, education, musical and movie preferences, fashion preferences, hobbies and other interests, friends, travel destinations, etc.

Demographics may be regarded as a type of context. One definition of context is "Any information that can be used to characterize the situation of an entity. An entity is a person, place or object that is considered relevant to the interaction between a user and an application, including the user and applications themselves."

Context information can be of many sorts, including the computing context (network connectivity, memory availability, CPU contention, etc.), user context (user profile, location, preferences, nearby friends, social network(s) and situation, etc.), physical context (e.g., lighting, noise level, traffic, etc.), temporal context (time of day, day, month, season, etc.), history of the above, etc. These and other contextual data can each be used as a basis for different watermark payloads (or, more generally, as a basis for different responses/payoffs to the user).

The position of the viewer needn't be determined by use of a camera associated with the electronic signage. Instead, data sensed by the viewer's cell phone can be used. There are a variety of approaches.

A preliminary issue in some embodiments is identifying what screen the viewer is watching. This information allows the user's cell phone to communicate with the correct electronic sign system (or the correct control system, which may govern many individual electronic signs). Often this step can be skipped, because there may only be one screen nearby, and there is no ambiguity (or the embodiment does not require such knowledge). In other contexts, however, there may be many screens, and analysis first needs to identify which one is being viewed. (Contexts with several closely-spaced screens include trade shows and airport concourses.)

One way to identify which screen is being watched is by reference to data indicating the position of the viewer, e.g., by latitude and longitude. If the positions of candidate screens are similarly known, the screen from which a viewer is capturing imagery may be determined by simple proximity.

GPS is a familiar location sensing technology, and can be used in certain embodiments. In other embodiments GPS may not suffice, e.g., because the GPS signals do not penetrate indoors, or because the positional accuracy is not sufficient. In such cases alternative location technologies can be used. One is detailed in published patent application WO08/073,347.

If latitude/longitude or the like leaves ambiguity, other position data relating to the viewer can be employed, such as magnetometer and/or accelerometer data indicating the compass direction towards which the cell phone is facing, and its inclination/declination relative to horizontal. Again, if the positions of the screens are adequately characterized, this information can allow unique identification of one screen from among many.

In other arrangements, screen content is used to identify the presentation being viewed. An image captured by the viewer's cell phone can be compared with imagery recently presented by a set of candidate screens, to find a best match. (The candidate screens may be identified by their gross geographic location, e.g., Portland Airport, or other methods for constraining a set of possible electronic signs can be employed.) The comparison can be based on a simple statistical metric, such as color histogram. Or it can be based on more detailed analysis—such as feature correlation between the cell phone image, and images presented on the candidate screens. Myriad comparison techniques are possible. Among them are those based on SIFT or image fingerprinting (both discussed below).

Digital watermark data encoded in the displayed imagery or video can also serve to identify the content/screen being watched.

(Sometimes several screens may be presenting the same visual content. In such case it may not matter whether the viewer is watching a screen in Concourse A or B, or in New York or California. Rather, what is relevant is the content being viewed.)

Similarly, audio content may be used to identify the content/screen to which the viewer is being exposed. Again, watermarking or comparison-based approaches (e.g., fingerprinting) can be used to perform such identification.

In other arrangements, still other screen identification techniques can be used. For example, a subliminal identifier can be emitted by the electronic sign (or associated loudspeaker) and discerned by the viewer's cell phone. In one such arrangement, luminance of the screen is subtly modulated to convey a binary identifier that is sensed by the phone. Similarly, an LED or other emitter positioned along the bezel of the screen can transmit an identifying pattern. (Infrared illumination can be used, since most cell cameras have some sensitivity down into infrared.)

In some embodiments, a remote server, such as server 18 in FIG. 1, receives position or image data from an inquiring cell phone, and determines—e.g., by comparison with reference data—which sign/content is being viewed. The remote server may then look-up an IP address for the corresponding computer 14 from a table or other data structure, and inform the sign system of the viewing cell phone. It may also transmit this address information to the cell phone—allowing the phone to communicate directly with the sign system. (Other communication means can alternatively be used. For example, the remote server can provide the cell phone with Bluetooth, WiFi, or other data enabling the cell phone to communicate with the sign system.) By such arrangements, a virtual session can be established between a phone and a sign system, defining a logical association between the pair.

Once the screen (or content) being viewed is known, the viewer's position relative to the screen can be determined.

Again, one technique relies on position data. If sufficient positional accuracy is available, the perspective from which an observer is viewing an electronic sign can be determined from knowledge of the observer's position and viewing orientation, together with the sign's position and orientation.

Another approach to determining the viewer's position relative to an electronic sign is based on apparent geometry. Opposing sides of the display screen are of equal lengths, and adjacent sides are at right angles to each other. If a pinhole camera model is assumed, these same relations hold for the depiction of the screen in imagery captured by the viewer's cell phone—if viewed from along the screen's center axis (i.e., its perpendicular). If not viewed from the screen's perpendicular, one or more of these relationships will be different; the rectangle will be geometrically distorted.

The usual geometric distortion is primarily the trapezoidal effect, also known as "keystoning." The geometric distortions in a viewer-captured image can be analyzed to determine the viewing angle to the screen perpendicular. This viewing angle, in turn, can indicate the approximate position of the viewer (i.e., where the viewing angle vector intersects the likely viewing plane—the plane in which the camera resides, e.g., 5.5 feet above the floor).

Known image processing techniques can be used to find the depiction of a quadrilateral screen in a captured image. Edge finding techniques can be employed. So can thresholded blobs (e.g., blurring the image, and comparing resultant pixel values to an escalating threshold until a quadrilateral bright object is distinguished). Or pattern recognition methods, such as using the Hough transform, can be used. An exemplary sign-finding methodology is detailed in Tam, "Quadrilateral signboard detection and text extraction," Int'l Conf. on Imaging, Science, Systems and Technology, pp. 708-713, 2003.

Once the screen is identified within the captured imagery, straightforward photogrammetric techniques can be applied to discern the viewing angle, by reference to the corner points, and/or from distortion of the displayed image contents. (An exemplary treatment of such analysis is provided in Chupeau, "In-theater piracy: finding where the pirate was," Proc. SPIE, Vo. 6819, 2008, which examines camcorded motion picture copies to determine the location in a movie auditorium from which the copy was filmed.)

If available, information modeling the lens system of the cell phone's camera can be used in connection with the image analysis, to yield still more accurate results. However, the pinhole camera model will generally suffice.

Depending on the particular embodiment, the viewing distance may not be a concern. (If relevant, viewing distance may be estimated by judging where the viewing angle intersects the viewing plane, as noted above.) In judging distance, the size of the sign can be used. This information is known to the sign system computer 14, and can be provided to the cell phone if the cell phone processor performs a distance estimation. Or if imagery captured by the cell phone is provided to the sign system computer for analysis, the computer can factor sign-size information into its analysis to help determine distance. (If the cell phone camera has a zoom feature, the captured image of the electronic sign may be of a scale that is not indicative of viewing distance. Data from the camera system, providing a metric indicating the degree of zoom, can be used by the relevant processor to address this issue.)

Figure 13A:
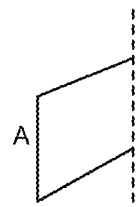
FIGS. 13A and 13B show partial screen views as captured by a cell phone.
Figure 13B:
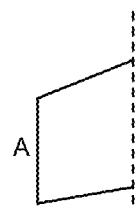

If the screen rectangle is not entirely captured within the cell phone image frame, some information about the user's position can nonetheless be determined. Considering, for example, the partial screen rectangle shown in FIG. 13A (one complete edge, and two incomplete opposing edges), the incompletely captured opposing edges appear to converge if extended, indicating that the viewer is to the left of edge A. In contrast, the diverging opposing edges of FIG. 13B indicate the viewer is to the right of edge A Still another way in which the observer's viewing position can be discerned from cell phone-captured image data is by reference to watermark information encoded in graphical data presented by the sign, and included in the user-captured imagery. Steganographically encoded watermark signals, such as detailed in U.S. Pat. No. 6,590,996, commonly include an orientation signal component by which the watermark decoder can detect affine geometrical distortions introduced in the imagery since encoding, so that the encoded payload can be decoded properly despite such distortions. In particular, the detailed watermark system allows six degrees of image distortion to be discerned from captured imagery: rotation, scale, differential scale, shear, and translation in both x and y.

These six parameters suffice for most at-a-distance viewing scenarios, where perspective effects are modest. Close-in perspective distortion can be handled by encoding the displayed imagery with several successive (or overlaid) watermark orientation signals: one conventional, and one or more others pre-distorted with different perspective transforms. The watermark reader can indicate which of the perspective-transformed orientation signals is decoded with the lowest error rate (or highest signal-to-noise ratio), indicating the perspective transformation. Alternatively, a conventional watermark can be encoded in the content, and the decoder can apply a series of different perspective transformations to the captured imagery prior to decoding, to identify the one yielding the lowest error rate (or highest S/N ratio).

(The use of bit errors as a metric for assessing quality of watermark decoding is detailed, e.g., in Bradley, "Comparative performance of watermarking schemes using M-ary modulation with binary schemes employing error correction coding," SPIE, Vol. 4314, pp. 629-642, 2001, and in patent publication US20020159614, as well as in others of the cited documents. These errors are ultimately corrected by error correction schemes.)

Yet another way to estimate the observer's viewing position is by reference to apparent distortion of known imagery presented on the display screen and captured by the observer's cell phone. SIFT, robust scene descriptor schemes, and image fingerprints that are robust to geometric transformation, can be used for this purpose. As part of the matching process, synchronization parameters can be estimated, allowing the position of the viewer to be estimated.

Displayed imagery from which viewer position information can be estimated does not need to be dedicated to this purpose; any graphic can be used. In some cases, however, graphics can be provided that are especially tailored to facilitate determination of viewer position.

For example, image-based understanding of a scene can be aided by presenting one or more features or objects on or near the screen, for which reference information is known (e.g., size, position, angle), and by which the system can understand other features—by relation. In one particular arrangement, a target pattern is displayed on the screen (or presented adjacent the screen) from which, e.g., viewing distance and orientation can be discerned. Such targets thus serve as beacons, signaling distance and orientation information to any observing camera system. One such target is the TRIPcode, detailed, e.g., in de Ipiña, TRIP: a Low-Cost Vision-Based Location System for Ubiquitous Computing, Personal and Ubiquitous Computing, Vol. 6, No. 3, May, 2002, pp. 206-219.

Figure 14:
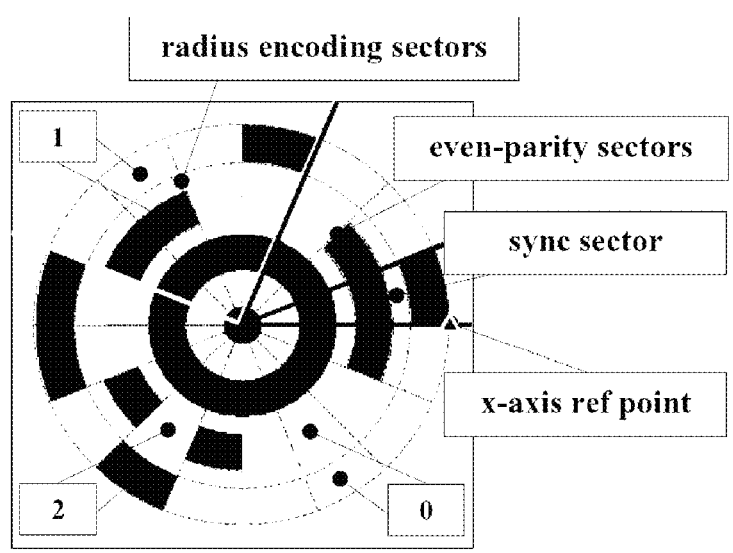
FIG. 14 shows a pattern by which direction and distance to a screen can be determined.

As detailed in the Ipiña paper, the target (shown in FIG. 14) encodes information including the target's radius, allowing a camera-equipped system to determine both the distance from the camera to the target, and the target's 3D pose. By presenting the target on the electronic screen at its encoded size, the Ipiña arrangement allows a camera-equipped system to understand both the distance to the screen, and the screen's spatial orientation relative to the camera.

The TRIPcode has undergone various implementations, being successively known as SpotCode, and then ShotCode (and sometimes Bango). It is now understood to be commercialized by OP3 B.V.

The aesthetics of the depicted TRIPcode target are not generally suited for display on signage. However, the pattern can be overlaid infrequently in one frame among a series of images (e.g., once every 3 seconds, in a 30 frame-per-second display arrangement). The position of the target can be varied to reduce visual artifacts. The color needn't be black; a less conspicuous color (e.g., yellow) may be used.

While a round target, such as the TRIPcode, is desirable for computational ease, e.g., in recognizing such shape in its different elliptical poses, markers of other shapes can be used. A square marker suitable for determining the 3D position of a surface is Sony's CyberCode and is detailed, e.g., in Rekimoto, CyberCode: Designing Augmented Reality Environments with Visual Tags, Proc. of Designing Augmented Reality Environments 2000, pp. 1-10. A variety of other reference markers can alternatively be used—depending on the requirements of a particular application.

As before, once a viewer's location relative to the sign has been discerned, such information can be communicated to the sign's computer system (if same was not originally discerned by such system), and a watermark targeting that viewer's spatial location can be defined and encoded in imagery presented on the sign. If the sign has a camera system from which it can estimate gender, age, or other attribute of viewers, it can tailor the targeted watermark payload (or the payoff associated with an arbitrary payload) in accordance with the estimated attribute(s) associated with the viewer at the discerned location. Or, such profile information may be provided by the viewer to the sign system computer along with the viewer-captured imagery (or with location information derived therefrom).

In another arrangement, a user's cell phone captures an image of part or all of the sign, and transmits same (e.g., by Bluetooth or internet TCP/IP) to the sign system computer. The sign system computer discerns the user's location from the geometry of the sign as depicted in the transmitted image. From its own camera, the sign system has characterized gender, age or other demographic(s) of several people at different locations in front of the sign. By matching the geometry-discerned location of the viewer who provided imagery by Bluetooth, with one of the positions in front of the sign where the sign system computer has demographically characterized viewers, the computer can infer the demographic(s) of the particular viewer from whom the Bluetooth transmission was received. The sign system can then Bluetooth-transmit payoff data back to that viewer—and tailor same to that particular viewer's estimated demographic(s). (Note that in this arrangement, as in some others, the payoff is sent by Bluetooth—not, e.g., encoded in a watermark presented on the sign.)

The type and variety of payoff that can be provided to the user's phone is virtually limitless. Electronic coupons have been noted above. Others include multimedia entertainment content (music videos, motion picture clips), and links/access credentials to online resources. A visitor to a trade show, for example, may share profile information indicating his professional occupation (e.g., RF engineer). Signage encountered at vendor booths may sense this information, and provide links showcasing the vendor's product offerings that are relevant to such a professional. The user may not act on such links while at the trade show, but may save them for later review when he returns to his office. In like fashion, other payoffs may be stored for later use.

In many instances, a user may wish to engage in a visually interactive session with content presented by an electronic sign—defining the user's own personal experience. For example, the user may want to undertake an activity that prompts one or more changes in the sign—such as by playing a game.

Contemporary cell phones offer a variety of sensors that can be used in such interactive sessions—not just pushbuttons (virtual or physical), but also accelerometers, magnetometers, cameras, etc. Such phones can be used like game controllers (think Wii) in conjunction with electronic sign systems. Two or more users can engage in multi-player experiences—with their devices controlling aspects of the sign system, through use of the camera and/or other sensors.

In one particular arrangement, a user's phone captures an image of a sign. The imagery, or other data from the phone, is analyzed to determine which sign (or content) is being viewed, as described earlier. The cell phone then exchanges information with the sign system (e.g., computer 14) to establish a session and control play of a game. For example, the cell phone may transmit imagery captured by the phone camera—from which motion of the phone can be deduced (e.g., by tracking one or more features across several frames of image data captured by the camera, as detailed in U.S. Pat. No. 7,174,031). Or, data from one or more accelerometers in the phone can be transmitted to the sign system—again indicating motion of the phone. As is conventional, the computer takes these signals as input, and controls play of the game accordingly.

The screen may be in an airport bar, and the game may be a virtual football game—sponsored by a local professional football team (e.g., the Seattle Seahawks). Anyone in the bar can select a team member to play (with available players identified by graphical icons on the edge of the display) through use of their cell phone. For example, a user can point their phone at the icon for a desired player (e.g., positioning the camera so the player icon appears at virtual crosshairs in the center of the phone's display screen) and then push/tap a physical/virtual button to indicate a selection. The phone image may be relayed to the sign system, to inform it of the player's selection. Or the phone can send an identifier derived from the selected icon, e.g., a watermark or image fingerprint.

The system provides feedback indicating that the player has been selected (graphic overlay, vibration, etc), and once selected, reflects that state on the electronic sign. After the player has been selected, the user controls the player's movements in future plays of the virtual football game by movement of the user's cell phone.

In another football game, the user does not control an individual player. Instead, the user acts as coach—identifying which players are to be swapped into or out of the lineup. The computer system then simulates play based on the roster of players selected by the user.

Another game is a virtual Lego game, or puzzle building exercise. One or more players can each select Lego or puzzle pieces on the digital screen (like picking players, above), and move them into place by pointing the camera to the desired location and issuing a signal (e.g., using the phone's user interface, such as a tap) to drop the piece in that place. The orientation at which the piece is placed can be controlled by the orientation of the user's phone when the "drop" signal is issued. In certain embodiments, each piece is uniquely identified by a watermark, barcode, fingerprint, or other feature recognition arrangement, to facilitate selection and control.

A few arrangements particularly contemplated by applicant include the following:

A method involving an electronic sign, viewed by a first observer, the method comprising: obtaining position information about the first observer (e.g., by reference to image data captured by a camera associated with the sign, or by a camera associated with the observer); defining a first digital watermark signal that takes into account the position information; encoding image data in accordance with said first digital watermark signal; and presenting the encoded image data on the electronic sign.

A second observer may be similarly treated, and provided a watermark signal that is the same or different than that provided to the first observer.

Another method involves an electronic sign system viewed by plural observers, each conveying a sensor-equipped device (e.g., a cell phone equipped with a microphone and/or camera). This method includes establishing a first data payload for a first observer of the electronic sign; establishing a second data payload for a second observer of the electronic sign; steganographically encoding audio or visual content data with digital watermark data, where the digital watermark data conveys the first and second data payloads; and presenting the encoded content data using the electronic sign system. In this arrangement, the sensor-equipped device conveyed by the first observer responds to the first data payload encoded in the presented content data but not the second data payload, and the sensor-equipped device conveyed by the second observer responds to the second data payload encoded in the presented content data but not the first data payload.

Another method involves an electronic sign system including a screen viewed by different combinations of observers at different times. This method includes detecting a first person observing the screen; encoding content presented by the electronic sign system with a first watermark signal corresponding to the first observer; while the first person is still observing the screen, detecting a second person newly observing the screen; encoding the content presented by the electronic sign system with a first watermark signal corresponding to the first observer, and also a second watermark signal corresponding to the second observer; when one of said persons is detected as no longer observing the sign, encoding the content presented on the electronic sign system with the watermark signal corresponding to a remaining observer, but not with the watermark signal corresponding to the person who is no longer observing the sign. By such arrangement, different combinations of watermark signals are encoded in content presented on the electronic sign system, in accordance with different combinations of persons observing the screen at different times.

Another method includes using a handheld device to capture image data from a display. A parameter of a digital watermark signal steganographically encoded in the captured image data is then determined. This parameter is other than payload data encoded by the watermark signal and may comprise, e.g., a geometrical parameter or an error metric. Depending on the outcome of this determination (which may include comparing the parameter against a reference), a decision is made as to how the device should respond to the display.

Yet another method involves an electronic sign, viewed by a first observer, and includes: obtaining first contextual information relating to the first observer; defining a first digital watermark signal that takes into account the first contextual information; steganographically encoding first image data in accordance with the first digital watermark signal; and presenting the encoded image data on the electronic sign. As before, the method may be extended to similarly treat a second observer, but with a second, different digital watermark signal. In such case, the same first image data is presented to both observers, but is steganographically encoded with different watermark signals in accordance with different contextual information.

In still another method, an electronic sign presents content that is viewed by plural observers. This method includes: using a first camera-equipped device conveyed by a first observer, viewing the presented content and capturing first image data corresponding thereto; determining first identifying data by reference to the captured first image data; using a second camera-equipped device conveyed by a second observer, viewing the same presented content and capturing second image data corresponding thereto, the second image data differing from the first due to different vantage points of the first and second observers; determining second identifying data by reference to the captured second image data; by reference to the first identifying data, together with information specific to the first device or first observer, providing a first response to the first device; and by reference to the second identifying data, together with information specific to the second device or second observer, providing a second, different, response to the second device. By such arrangement, the first and second devices provide different responses to viewing of the same content presented on the electronic sign. (The second identifying data can be the same as the first identifying data, notwithstanding that the captured first image data is different than the captured second image data.)

Yet another method includes capturing image data corresponding to an electronic sign using a camera-equipped device conveyed by the observer; determining which of plural electronic signs is being observed by a first observer, by reference to the captured image data; and exchanging data between the device and the electronic sign based, at least in part, on said determination.

In such arrangement, data can be transmitted from the device, such as data dependent at least in part on the camera, or motion data. The motion data can be generated by use of one or more accelerometers in the device, or can be generated by tracking one or more visible features across several frames of image data captured by the camera.

Another method concerns providing demographically-targeted responses to observers of an electronic sign, based on viewing location. This method includes: obtaining first demographic information relating to a first observer, and second demographic information relating to a second observer; determining first response data associated with the first demographic information, and second response data associated with the second demographic information; obtaining first location data relating to the first observer, and second location data relating to the second observer; receiving image data from an observer's device; processing the received image data to estimate a location from which it was captured; and if the estimated location is the first location, returning the first response data to said device. (If the estimated location is the second location, second response data can be returned to the device.)

A further method includes establishing an association between a camera-equipped device conveyed by an observer, and an electronic sign system; receiving data from the device, wherein the received data depends—at least in part—on image data captured by the camera; and controlling an operation of the electronic sign system, at least in part, based on the received data.

This method can further include presenting depictions of plural game items on the electronic sign; and receiving data from the device, indicating that the observer has viewed using the camera device—and selected—a particular one of said game item depictions presented on the screen. A depiction of game play can be presented on the electronic sign, where such play reflects the observer's selection of the particular game item.

The depicted game items can comprise puzzle pieces, and the method can include receiving signals from the device indicating a position, and orientation, at which a puzzle piece is to be deposited, wherein said signals depend, at least in part, on image data captured by the camera.

A second observer can also participate, e.g., by establishing a logical association between a camera-equipped second device conveyed by the second observer, and the electronic sign; receiving data from the second device, wherein said received data depends—at least in part—on image data captured by the second device, said received data indicating that the second observer has viewed using the camera of the second device—and selected—a particular different one of said depicted puzzle pieces; and receiving signals from the second device indicating a position, and orientation, at which the different one of said depicted puzzle pieces is to be deposited, wherein said signals depend, at least in part, on image data captured by the camera of the second device.

Selection of particular game items can proceed by use of feature recognition, digital watermark-based identification, barcode-based identification, fingerprint-based identification, etc.

In another method, an electronic sign presents content that is viewed by plural observers. This method includes: by use of a first camera-equipped device conveyed by a first observer, viewing the presented content and capturing first image data corresponding thereto; processing the first image data to produce first identifying data; by use of a second camera-equipped device conveyed by a second observer, viewing the same presented content and capturing second image data corresponding thereto, the second image data differing from the first due to different vantage points of the first and second observers; processing the second image data to produce second identifying data; using a sensor associated with the electronic sign, capturing third image data depicting the first and second observers; processing the third image data to estimate demographic data associated with the first and second observers; by reference to the estimated demographic data, determining first response data for the first observer, and second, different, response data for the second observer; also processing the third image data to generate first location information corresponding to the first observer, and second location information corresponding to the second observer; receiving first or second identifying data; by reference to the generated location information, determining whether the received identifying data is based on image data captured by the first device or the second device; if the received identifying data is determined to have been based on image data captured by the first device, responding to said received identifying data with the first response data; and if the received identifying data is determined to have been based on image data captured by the second device, responding to said received identifying data with the second response data. By such arrangement, the method infers from which observer the identifying data was received, and responds with demographically-determined response data corresponding to that observer.

Yet another method includes, by use of a first sensor-equipped device conveyed by a user, capturing content data from an electronic sign system; by reference to a time-base, determining which of plural temporal portions of digital watermark data encoded in the captured content data corresponds, contextually, to the user; and taking an action based on a determined temporal portion of the digital watermark data.

Still another method includes receiving input image data having an undistorted aspect; encoding the input image data in accordance with a steganographic digital watermark pattern; and presenting the encoded image data on a display screen; wherein the steganographic digital watermark pattern has distorted aspect relative to the input image data. (The digital watermark pattern may be distorted in accordance with a position of an observer.)

In some of the arrangements detailed herein, the sign being viewed by the observer is identified by reference to location information about the observer and the sign. In others, identification is made by reference to image data captured by the observer (e.g., using robust local image descriptors, fingerprint, or watermark data).

Similarly, in some of the detailed arrangements, the scale of a watermark signal may be tailored in accordance with a viewing distance; and/or the projection of a watermark signal may be tailored in accordance with a viewing angle (e.g., the watermark signal may be pre-distorted in accordance with viewer location). A watermark's payload may be established in accordance with demographic information about the observer (e.g., obtained from the observer, or estimated from observation of the observer).

If the content is visual (rather than audio), the encoding of watermark data may be pre-distorted in accordance with a viewing geometry associated with the observer. In some arrangements, plural data payloads may be decoded in one of said sensor-equipped devices, but only one of the decoded payloads is selected for response (e.g., because it corresponds to profile data associated with the device or its user, e.g., stored in the sensor-equipped device. Such profile information may indicate gender, age, and/or home zip code data). Different payloads may be multiplexed, e.g., in time or frequency.

Yet another method includes capturing imagery using a camera associated with a first system; detecting features in the captured imagery; and identifying, to a second system, augmented reality graphical data associated with the detected features, wherein the second system is different than the first. The first system may comprise an electronic sign system, and the second system may comprise a user's cell phone. The method can additionally include presenting augmented reality graphical data on the second system, wherein the presented data is a tailored in accordance with one or more demographic attributes of user of the second system.

Other Comments

While this specification earlier noted its relation to the assignee's previous patent filings, it bears repeating. These disclosures should be read in concert and construed as a whole. Applicant intends that features in each disclosure be combined with features in the others. Thus, for example, the arrangements and details described in the present specification can be used in variant implementations of the systems and methods described in the earlier-cited patents and applications, while the arrangements and details of those documents can be used in variant implementations of the systems and methods described in the present specification. Similarly for the other noted documents. Thus, it should be understood that the methods, elements and concepts disclosed in the present application can be combined with the methods, elements and concepts detailed in those related applications. While some such arrangements have been particularly detailed in the present specification, many have not—due to the large number of permutations and combinations. However, implementation of all such combinations is straightforward to the artisan from the provided teachings.

Having described and illustrated the principles of the technology with reference to illustrative features and examples, it will be recognized that the technology is not so limited.

For example, while reference has been made to mobile devices such as cell phones, it will be recognized that this technology finds utility with all manner of devices. PDAs, organizers, portable music players, desktop computers, laptop computers, tablet computers, netbooks, ultraportables, wearable computers, servers, etc., can all make use of the principles detailed herein. Particularly contemplated phones include the Apple iPhone, and smart phones following Google's Android specification (e.g., the G1 phone, manufactured for T-Mobile by HTC Corp., the Motorola Droid phone, and the Google Nexus phone). The term "cell phone" should be construed to encompass all such devices, even those that are not strictly-speaking cellular, nor telephones (e.g., the recently announced Apple iPad device).

This technology can also be implemented using face-worn apparatus, such as augmented reality (AR) glasses. Such glasses include display technology by which computer information can be viewed by the user—either overlaid on the scene in front of the user, or blocking that scene. Virtual reality goggles are an example of such apparatus.

Exemplary technology is detailed in patent documents U.S. Pat. No. 7,397,607 and 20050195128. Commercial offerings include the Vuzix iWear VR920, the Naturalpoint Trackir 5, and the ezVision X4 Video Glasses by ezGear. An upcoming alternative is AR contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user, electronic signs, or others), and they can include self-contained processing capability. Likewise, they may incorporate other features known from existing smart phones and patent documents, including electronic compass, accelerometer, camera(s), projector(s), GPS, etc.

Further out, features such as laser range finding (LIDAR) may become standard on phones (and related devices), and can be employed in conjunction with the present technology (e.g., to identify signs being viewed by the observer, and their distance).

The design of cell phones and other computer devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented to various forms of processor circuitry, including programmable logic devices, FPGAs (e.g., Xilinx Virtex series devices), FPOAs (e.g., PicoChip brand devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices.

Software instructions for implementing the detailed functionality can be readily authored by artisans, from the descriptions provided herein, e.g., written in C, C++, Visual Basic, Java, Python, Tcl, Perl, Scheme, Ruby, etc. Mobile devices according to the present technology can include software modules for performing the different functions and acts. Software applications for cell phones can be distributed through different vendors ap stores (e.g., the Apple Ap Store, for iPhone devices).

Commonly, each device includes operating system software that provides interfaces to hardware resources and general purpose functions, and also includes application software which can be selectively invoked to perform particular tasks desired by a user. Known browser software, communications software, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality described in this specification can be implemented on different devices. For example, in a system in which a cell phone communicates with a sign system computer, different tasks can be performed exclusively by one device or the other, or execution can be distributed between the devices. Extraction of watermark data and fingerprints from imagery, and estimation of viewing angle and distance, are but a few examples of such tasks. Thus, it should be understood that description of an operation as being performed by a particular device (e.g., the sign system computer) is not limiting but exemplary; performance of the operation by another device (e.g., a cell phone, or a remote computer), or shared between devices, is also expressly contemplated. As will be understood by the artisan, the results of any operation can be sent to another unit for use in subsequent operation(s).

In like fashion, description of data being stored on a particular device is also exemplary; data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies one or more nearby mobile or other devices through Bluetooth communication, and involves one or more of them in a task.)

It will be recognized that the detailed processing of content signals (e.g., image signals, audio signals, etc.) includes the transformation of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed in various ways and for various purposes during processing, producing various data structure representations of the signals and related information. In turn, the data structure signals in memory are transformed for manipulation during searching, sorting, reading, writing and retrieval. The signals are also transformed for capture, transfer, storage, and output via display or audio transducer (e.g., speakers).

Implementations of the present technology can make use of user interfaces employing touchscreen technology. Such user interfaces (as well as other aspects of the Apple iPhone) are detailed in published patent application 20080174570.

Touchscreen interfaces are a form of gesture interface. Another form of gesture interface that can be used in embodiments of the present technology operates by sensing movement of a smart phone—by tracking movement of features within captured imagery. Further information on such gestural interfaces is detailed in Digimarc's U.S. Pat.

No. 6,947,571. Gestural techniques can be employed whenever user input is to be provided to the system.

In some embodiments, the detailed functionality must be activated by user instruction (e.g., by launching an ap). In other arrangements, the cell phone device may be configured to run in a media-foraging mode—always processing ambient audio and imagery, to discern stimulus relevant to the user and respond accordingly.

Sensor information (or data based on sensor information) may be referred to the cloud for analysis. In some arrangements this is done in lieu of local device processing (or after certain local device processing has been done). Sometimes, however, such data can be passed to the cloud and processed both there and in the local device simultaneously. The cost of cloud processing is usually small, so the primary cost may be one of bandwidth. If bandwidth is available, there may be little reason not to send data to the cloud, even if it is also processed locally. In some cases the local device may return results faster; in others the cloud may win the race. By using both, simultaneously, the user is assured of the speediest possible results.

While this disclosure has detailed particular ordering of acts and particular combinations of elements in the illustrative embodiments, it will be recognized that other methods may re-order acts (possibly omitting some and adding others), and other combinations may omit some elements and add others, etc.

Although disclosed as complete systems, sub-combinations of the detailed arrangements are also separately contemplated.

Elements and teachings within the different embodiments disclosed in the present specification are also meant to be exchanged and combined.

Reference was made to the internet in certain embodiments. In other embodiments, other networks—including private networks of computers—can be employed also, or instead.

While this specification focused on capturing imagery from electronic signage, and providing associated payoffs to observers, many similar arrangements can be practiced with the audio from electronic signage. The perspective-based features are not readily available with audio, but other principles detailed herein can be adapted to audio-only implementations.

In all the detailed embodiments, advertising may be presented on the electronic signage. Measurements noting the length of viewer engagement with different signs, and number of commercial impressions, can be logged, and corresponding census-based reports can be issued to advertisers by audience survey companies. This information can be compiled by software in the phone, or by software associated with the sign. Knowing demographic information about the viewer allows targeted advertising to be presented. If a communication session is established, follow-up information can be sent using the same information channel. Advertising may also be presented on the user's cell phone, and similarly measured.

Related arrangements are detailed in published patent applications 20080208849 and 20080228733 (Digimarc), 20080165960 (TagStory), 20080162228 (Trivid), 20080178302 and 20080059211 (Attributor), 20080109369 (Google), 20080249961 (Nielsen), and 20080209502 (MovieLabs).

Technology for encoding/decoding watermarks is detailed, e.g., in Digimarc's patents cited earlier, as well as in Nielsen's U.S. Pat. Nos. 6,968,564 and 7,006,555, and in Arbitron's U.S. Pat. Nos. 5,450,490, 5,764,763, 6,862,355, and 6,845,360.

Content fingerprinting seeks to distill content (e.g., a graphic, a video, a song, etc.) down to an essentially unique identifier, or set of identifiers. Many fingerprinting techniques are known. Examples of image/video fingerprinting are detailed in patent publications U.S. Pat. No. 7,020,304 (Digimarc), U.S. Pat. No. 7,486,827 (Seiko-Epson), U.S. Pat. No. 5,893,095 (Virage), 20070253594 (Vobile), 20080317278 (Thomson), and 20020044659 (NEC). Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 6,834,308 (Audible Magic), U.S. Pat. No. 7,516,074 (Auditude), and U.S. Pat. Nos. 6,990,453 and 7,359,889 (both Shazam).

Scale Invariant Feature Transform (SIFT) may be regarded as a form of image fingerprinting. Unlike some others, it can identify visual information despite affine and perspective transformation. SIFT is further detailed in certain of the earlier cited applications (e.g., US20100048242) as well as in patent documents U.S. Pat. No. 6,711,293 and WO07/130,688.

While SIFT is perhaps the most well known technique for generating robust local scene descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006); as well as Chen et al, "Efficient Extraction of Robust Image Features on Mobile Devices," Proc. of the $6^{th}$ IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A survey of local descriptor features is provided in Mikolajczyk et al, "A Performance Evaluation of Local Descriptors," IEEE Trans. on Pattern Analysis and Machine Intelligence, 2005.

Nokia has done work on visual search, including published patent applications 20070106721, 20080071749, 20080071750, 20080071770, 20080071988, 20080267504, 20080267521, 20080268876, 20080270378, 20090083237, 20090083275, and 20090094289. Features and teachings detailed in these documents are suitable for combination with the technologies and arrangements detailed in the present application, and vice versa.

While many of the embodiments make use of watermarking technology to convey data from the sign system to observing cell phones, in other embodiments other communications technologies can be used between the phone and the sign system, such as RFID, Near Field Communication, displayed barcodes, infrared, SMS messaging, etc. Image or other content fingerprinting can also be used to identify (e.g., to the cell phone) the particular display being observed. With the display thus-identified, a corresponding store of auxiliary information can be accessed, and corresponding actions can then be based on the stored information.

As noted, position data about the observer can be determined by means such as GPS, or by the technology detailed in published patent application WO08/073,347. The same technology can be used to identify the location of electronic signs. From such information, the fact that a particular observer is viewing a particular sign can be inferred. A store of auxiliary information—detailing, e.g., a payoff to the observer—can thereby be identified and accessed, to enable the corresponding payoff. (The system of WO08/073,347 can also be used to generate highly accurate time information, e.g., on which time-based systems can rely.)

If imagery captured by the cell phone is sent to the sign system, metadata accompanying the imagery commonly identifies the make and model of the cell phone. This information can be stored by the sign system and used for various purposes. One is simply to demographically classify the user (e.g., a user with a Blackberry is more likely a business person, whereas a person with a Motorola Rival is more likely a teen). Another is to determine information about the phone's camera system (e.g., aperture, resolution, etc.). Watermark or other information presented on the electronic sign can then be tailored in accordance with the camera particulars (e.g., the size of the watermarking tile)—a type of "informed embedding."

Relatedly, if no information has been received from the user by the sign system, the sign may nonetheless estimate something about the user's cell phone camera, by reference to the user's estimated age, gender and/or ethnicity. Stored reference data, for example, can indicate the popularity of different phone (camera) models with different demographic groups. E.g., the peak demographic for the Apple iPhone is reported to be the 35-54 year old age group, owning about 36% of these devices, whereas 13-17 year olds only own about 5% of these devices. Men are much more likely than women to own Android phones. Update cycles for phones also varies with demographics. A 15 year old boy is likely to be carrying a cell phone that is less than a year old, whereas a 50 year old woman is more likely to be carrying a cell phone that is at least two years old. Older phones have lower resolution cameras. Etc. Thus, by estimating the viewer's age and gender, an informed guess may be made about the cell phone camera that the user may be carrying. Again, the display on the sign can be tailored accordingly (e.g., by setting watermarking parameters in accordance with estimated camera resolution).

The detailed technology can also employ augmented reality (AR) techniques. AR has been popularized by iPhone/Android applications such as UrbanSpoon, Layar, Bionic Eye, Wikitude, Tonchidot, and Google Goggles, the details of which are familiar to the artisan. Exemplary AR systems are detailed in patent documents US20100045869, US20090322671 and US20090244097. Briefly, such arrangements sense visual features in captured imagery, and present additional information on a viewing screen—commonly as an overlay on the originally-captured imagery. In the present context, the information displayed on electronic signage can be used as the visual features. The overlay can be presented on the user's phone, and be customized to the user, e.g., by context (including viewing location and/or demographics). Information can be exchanged between the phone and the sign system via watermark data encoded in imagery displayed on the electronic sign. Other arrangements can also be employed, such as IP, Bluetooth, etc., once a logical association has been established between a particular cell phone and a particular sign/content.

In other arrangements the user's cell phone 16, or the camera 12 of the electronic sign system, captures imagery from which features are sensed. Associated displays/information may then be presented on the display screen 10 of the electronic sign system. Such information may be presented on the sign as an overlay on the captured imagery containing the sensed features, or separately.

Elements from the detailed arrangements can be combined with elements of the prior art—such as noted in the Background discussion—to yield additional implementations.

While certain operations are described as taking place in computer 14, cell phone 16, or remote server(s) 18, etc., the location of the various operations is flexible.

Operations can take place on any appropriate computer device (or distributed among plural devices), and data relayed as necessary.

Although illustrated in the context of large-format public displays, it should be recognized that the same principles find application elsewhere, including with conventional laptop displays, other cell phone displays, electronic picture frames, e-books, televisions, motion picture projection screens, etc. Microsoft's "Second Light" technology, as detailed in Izadi et al, "Going Beyond the Display: A Surface Technology with an Electronically Switchable Diffuser," Microsoft Research, 2009, can also be used in conjunction with the principles detailed herein.

Naturally, the technology is not limited to flat displays but is also applicable with curved displays.

Face-finding algorithms are well known (e.g., as employed in many popular consumer cameras) and can be employed to identify the faces of observers, and locate their eyes. As noted, the distance between an observer's eyes, e.g., in pixels in imagery captured by camera 12, can be used in the various embodiments to estimate the observer's distance from the camera (and thus from the display screen).

Figure 15:
FIG. 15 is a diagram showing an illustrative 64 bit watermark payload.

A sample watermark payload protocol is shown in FIG. 15. It includes 8 bits to identify the protocol (so the cell phone watermark decoder system knows how to interpret the rest of the payload), and 4 bits to indicate the demographic audience to which it is targeted (e.g., men between the ages of 30 and 55). The "immediate response data" that follows is literal auxiliary data that can be used by the cell phone without reference to a remote database. For example, it conveys text or information that the cell phone—or another system—can use immediately, such as indexing a small store of payoff data loaded into a cell phone data store, to present different coupons to different merchants. The remaining 20 bits of data serves to index a remote database where corresponding information (e.g., re coupons or other payoffs) is stored. Other data fields, such as one indicating an age-appropriateness rating, can additionally, or alternatively, be employed. The protocol may be extensible, e.g., by a flag bit indicating that a following payload conveys additional data.

The payload of FIG. 15 is simply illustrative. In any particular implementation, a different payload will likely be used—depending on the particular application requirements.

Camera systems and associated software from Quividi and/or TruMedia can be used for camera 12, to identify observers and classify them demographically demographics.

It will be recognized that certain embodiments of the present technology allow a signboard to serve as a "narrowcaster," as contrasted with its usual "broadcaster" role. And yet this is achieved in open fashion, without resort to closed architectures in which, e.g., specified devices or dedicated protocols must be used.

In the interest of conciseness, the myriad variations and combinations of the described technology are not cataloged in this document. Applicant recognizes and intends that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure without unduly lengthening this specification, applicant incorporates-by-reference the documents and patent disclosures referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

I claim:

1. A method implemented by an electronic sign system, viewed by a first observer, comprising the acts:
    establishing a logical association between a camera-equipped apparatus conveyed by the observer, and the electronic sign system, using geometric analysis or feature recognition performed on imagery of the electronic sign system captured by the camera-equipped apparatus;
    presenting depictions of plural game items on the electronic sign;
    receiving data from the apparatus, wherein the received data depends—at least in part—on image data captured by the camera, and on motion-related data from a motion sensor in the apparatus, said received data indicating that the observer has viewed using the camera—and selected—a particular one of said game item depictions presented on the screen, said selection proceeding by use of feature recognition applied to imagery captured by the camera-equipped apparatus;
    receiving, at the electronic sign system, signals from the apparatus indicating a position, and orientation, at which a game item is to be deposited, wherein said signals depend, at least in part, on image data captured by the camera; and
    controlling, using a processor of the electronic sign system, an operation of the electronic sign system, at least in part, based on the received data, said controlling including presenting a depiction of game play on the electronic sign, wherein the game play reflects the observer's selection of the particular game item.

2. The method of claim 1 wherein the depicted game items comprise puzzle pieces.

3. The method of claim 1 wherein the electronic sign is also viewed by a second observer, and the method includes:
    establishing a logical association between a camera-equipped second apparatus conveyed by the second observer, and the electronic sign;
    receiving data from the second apparatus, wherein said received data depends—at least in part—on image data captured by the second apparatus, said received data indicating that the second observer has viewed using the camera of the second apparatus—and selected—a particular different one of said depicted game items; and
    receiving signals from the second apparatus indicating a position, and orientation, at which the different one of said depicted game items is to be deposited, wherein said signals depend, at least in part, on image data captured by the camera of the second apparatus.

4. The method of claim 1 wherein the feature recognition comprises digital watermark-based identification.

5. The method of claim 1 wherein the use of feature recognition to select a particular one of said game item depictions further comprises barcode-based identification.

6. The method of claim 1 wherein the feature recognition comprises fingerprint-based identification.

7. An electronic sign system comprising:
    a display;
    a processor; and
    a memory;
    the memory containing software instructions causing the sign system to perform acts including:
    establishing a logical association between a camera-equipped apparatus conveyed by the observer, and the electronic sign system, using geometric analysis or feature recognition performed on imagery of the electronic sign system captured by the camera-equipped apparatus;
    presenting depictions of plural game items on the electronic sign;
    receiving data from the apparatus, wherein the received data depends—at least in part—on image data captured by the camera, and on motion-related data from a motion sensor in the apparatus, said received data indicating that the observer has viewed using the camera—and selected—a particular one of said game item depictions presented on the screen, said selection having proceeded by use of feature recognition applied to imagery captured by the camera-equipped apparatus;
    receiving, at the electronic sign system, signals from the apparatus indicating a position, and orientation, at which a game item is to be deposited, wherein said signals depend, at least in part, on image data captured by the camera; and
    controlling an operation of the electronic sign system, at least in part, based on the received data, said controlling including presenting a depiction of game play on the electronic sign, wherein the game play reflects the observer's selection of the particular game item.

8. The electronic sign system of claim 7 wherein the depicted game items comprise puzzle pieces.

9. The sign system of claim 7 in which said instructions further cause the sign system to perform acts including:
    establishing a logical association between a camera-equipped second apparatus conveyed by a second observer, and the electronic sign;
    receiving data from the second apparatus, wherein said received data is dependent—at least in part—on image data captured by the second apparatus, said received data indicating that the second observer has viewed using the camera of the second apparatus—and selected—a particular different one of said depicted game items;
    receiving signals from the second apparatus indicating a position, and orientation, at which the different one of said depicted game items is to be deposited, wherein said signals depend, at least in part, on image data captured by the camera of the second apparatus; and
    controlling an operation of the electronic sign system, at least in part, based on the received signals.

10. A mobile apparatus comprising:
    a camera;
    a motion sensor;
    a processor; and
    a memory, the memory containing programming instructions that configure the apparatus to perform acts including:
    establishing a logical association between the apparatus and an electronic sign system, using geometric analysis or feature recognition performed on imagery of the electronic sign system captured by the camera-equipped apparatus; and sending data from the apparatus to the sign system, said sent data including data indicating that a user of the apparatus has viewed using the apparatus—and selected—a particular one of plural game item depictions presented by the electronic sign system, said selection proceeding by use of feature recognition applied to imagery captured by the camera-equipped apparatus;

wherein the sent data depends—at least in part—on image data captured by the camera, and on motion-related data from the motion sensor, and the sent data serves to control—at least in part—operation of the electronic sign; and wherein the depicted game items comprise game items, and the instructions configure the apparatus to send signals to the electronic sign system indicating a position, and orientation, at which a game items is to be deposited, wherein said signals depend, at least in part, on image data captured by the camera.

11. The mobile apparatus of claim 10 wherein the feature recognition comprises digital watermark-based identification.

12. The mobile apparatus of claim 10 wherein the use of feature recognition to select a particular one of said qame item depictions further comprises barcode-based identification.

13. The mobile apparatus of claim 10 wherein the feature recognition comprises fingerprint-based identification.

* * * * *